US005542086A

United States Patent [19]

Andrew et al.

[11] Patent Number: 5,542,086
[45] Date of Patent: Jul. 30, 1996

[54] DOCUMENT TYPE METAMORPHOSIS IN AN OBJECT-ORIENTED OPERATING SYSTEM HAVING A GRAPHICAL USER INTERFACE

[75] Inventors: Christopher Andrew, Orem; Scott Kliger, Salt Lake City, both of Utah

[73] Assignee: Novell, Inc., Orem, Utah

[21] Appl. No.: 87,585

[22] Filed: Jul. 6, 1993

[51] Int. Cl.⁶ ................................................. G06F 17/30
[52] U.S. Cl. ................. 395/600; 364/282.1; 364/DIG. 1
[58] Field of Search ...................... 364/DIG. 1, DIG. 2; 395/600, 12, 145, 148, 154–157, 159

[56] References Cited

U.S. PATENT DOCUMENTS

| | | | |
|---|---|---|---|
| 5,287,447 | 2/1994 | Miller et al. | 395/157 |
| 5,345,550 | 9/1994 | Bloomfield | 395/156 |
| 5,371,851 | 12/1994 | Pieper et al. | 395/164 |
| 5,379,366 | 1/1995 | Noyes | 395/54 |
| 5,384,911 | 1/1995 | Bloomfield | 395/157 |

OTHER PUBLICATIONS

Simpson, A. 'Mastering Word Perfect 5.1 & 5.2 for Windows', SYBEX, 1993, pp. 409–411, 425, 429–431, 439–441, 852–871 and 1063–1065.

Cowart, R. 'Mastering Windows 3.1, Special Edition', SYBEX, 1992, pp. 74–96, 126–130, 470–499, 725–729, 765–766, 823, 838 and 914.

*Primary Examiner*—Thomas G. Black
*Assistant Examiner*—Maria N. Von Buhr
*Attorney, Agent, or Firm*—Dinsmore & Shohl

[57] ABSTRACT

The invention comprises an apparatus and method in an object-oriented computer operating system for efficiently assigning to object classes document objects created on a different computer system.

10 Claims, 3 Drawing Sheets

DOCUMENT TYPE METAMORPHOSIS IN AN OBJECT-ORIENTED OPERATING SYSTEM HAVING A GRAPHICAL USER INTERFACE

BACKGROUND OF THE INVENTION

As computing has become a ubiquitous function in business, government, academia and personal life, and as many diverse computer systems have become widely adopted, it has become increasingly important that a document created on one computer system can be read and edited on a different system. To give a common example, many organizations now have large numbers of disparate computer systems, including personal computers running the DOS operating system, with and without the overlying Windows environment, OS/2, Apple Macintosh computers, and workstations running various forms of the UNIX operating system. Documents created by an application running on one of these platforms typically cannot be read and edited on another platform.

In response to this situation, some application software developers have created versions of their programs, whether to perform word processing, spreadsheets or graphics functions, that operate on several different operating systems or "platforms." WordPerfect Corporation, for example, the assignee of the present invention, markets versions of its WordPerfect word processing program that operate in all of the platforms mentioned above, as well as many others.

Due to user preference, hardware availability, etc., documents created on a particular platform using an application that has separate versions for each of several different platforms will often need to be transported to one of the other platforms. For example, a document created on a DOS/Windows version of WordPerfect may later be brought to an OS/2 computer system having several application programs, including WordPerfect. Where the application program on a particular platform can read a document created on any other platform, as is the case for WordPerfect, the user will expect that the OS/2 operating system will not impede his/her ability to edit or read such documents created on, e.g., the DOS/Windows version of WordPerfect.

Moreover, since documents are represented as icons on the screen of OS/2 (and other graphically oriented systems), the user will simply select the document by double-clicking on its icon and expect that the operating system will be able to determine that the WordPerfect program must be put into operation before the document is retrieved. The OS/2 operating system in that situation must recognize that need, i.e., must be able to determine that the WordPerfect application program must be initiated before the document can be viewed or edited.

The OS/2 operating system provides a method for insuring that the proper application program will be invoked when the user selects a document by icon, at least if the document has previously been categorized or "typed." Specifically, the Workplace Shell component of OS/2, an object-oriented graphical user interface, includes the ability to modify the behavior of document object icons used by a particular application. In particular, a function contained in the Workplace Shell allows the programmer to give the icon representing any document that was created using a particular application program a unique appearance as well as a customized context menu and additional pages in the Workplace Shell Settings Notebook. The same function also guarantees that the operating system will run the associated application program when the user opens a chosen document.

The programming interface of OS/2 is object-oriented and is based on what is called the System Object Model ("SOM"). The SOM is a set of programming language-independent object classes that facilitate connections between objects written in any programming language and the OS/2 operating system. The Workplace Shell provides a set of SOM object class libraries that correspond to functions provided by the operating system and functions needed to create and display iconic objects to the user. To customize the document object icons for a given application, the programmer must create a Workplace Shell SOM object class that contains the desired customizations and then specify how files of documents within that class can be distinguished from other file objects that may exist on the system. For more information concerning the OS/2 Workplace Shell, and OS/2 in general, see the following, incorporated herein by reference:

IBM OS/2 Technical Library Version 2.00:
   SOM Guide and Reference
   Application Design Guide
   Presentation Manager Programming Reference Vol. 2

OS/2 provides two ways to distinguish document file objects associated with a particular application: file name extensions and extended attributes.

The file name extension frequently indicates what type of data that file contains, and OS/2 is capable of recognizing such extensions. For example, the Workplace Shell allows an object class to be associated with a particular file name filter or pattern such as "*.BAT," "*.INI" or "*.DOC". Therefore, it is possible to have all file names of documents created using a particular application to have a common file name portion. However, for application programs such as WordPerfect, which permit the user to choose file names and extensions freely, use of a designated extension is not a reliable way of associating document objects to an application.

Second, OS/2 permits the addition of up to 64 kilobytes of information about a particular file in an area called an extended attribute. The extended attribute information can relate to the icon for the file, file activity history, network security information, or required program settings. In particular, it is possible to specify a ".TYPE" name for a file, or an entire directory of files. This method of characterizing a file allows a document object already recognized by OS/2 to be associated to a particular application program irrespective of its current file name and extension. Therefore, the .TYPE extended attribute feature can be used to associate documents with applications even for application programs that permit users to choose totally arbitrary file names and extensions.

However, a file can be "typed" using the .TYPE extended attribute only within the OS/2 operating system environment. In other words, a document created using an application from another operating system could not be "typed," and therefore this method would not permit the user who has installed an OS/2 version of the application to open the document from the Workplace Shell without first manually identifying the document as one requiring the particular application. Only those documents created or previously edited on an OS/2 system would have the .TYPE extended attribute associated with the application program, e.g., WordPerfect; documents created by WordPerfect on different operating systems would not be recognized as being associated with WordPerfect.

SUMMARY OF THE INVENTION

The present invention provides a solution to this problem and permits the proper typing, within the Workplace Shell component of the OS/2 operating system, of documents created on disparate computer systems. The invention involves first, recognition of a particular type of document object by its file signature, and second, the continuous analyzing of the file signatures of document objects as they are found by the operating system in an asynchronous threading of execution.

DETAILED DESCRIPTION

Figure 1:
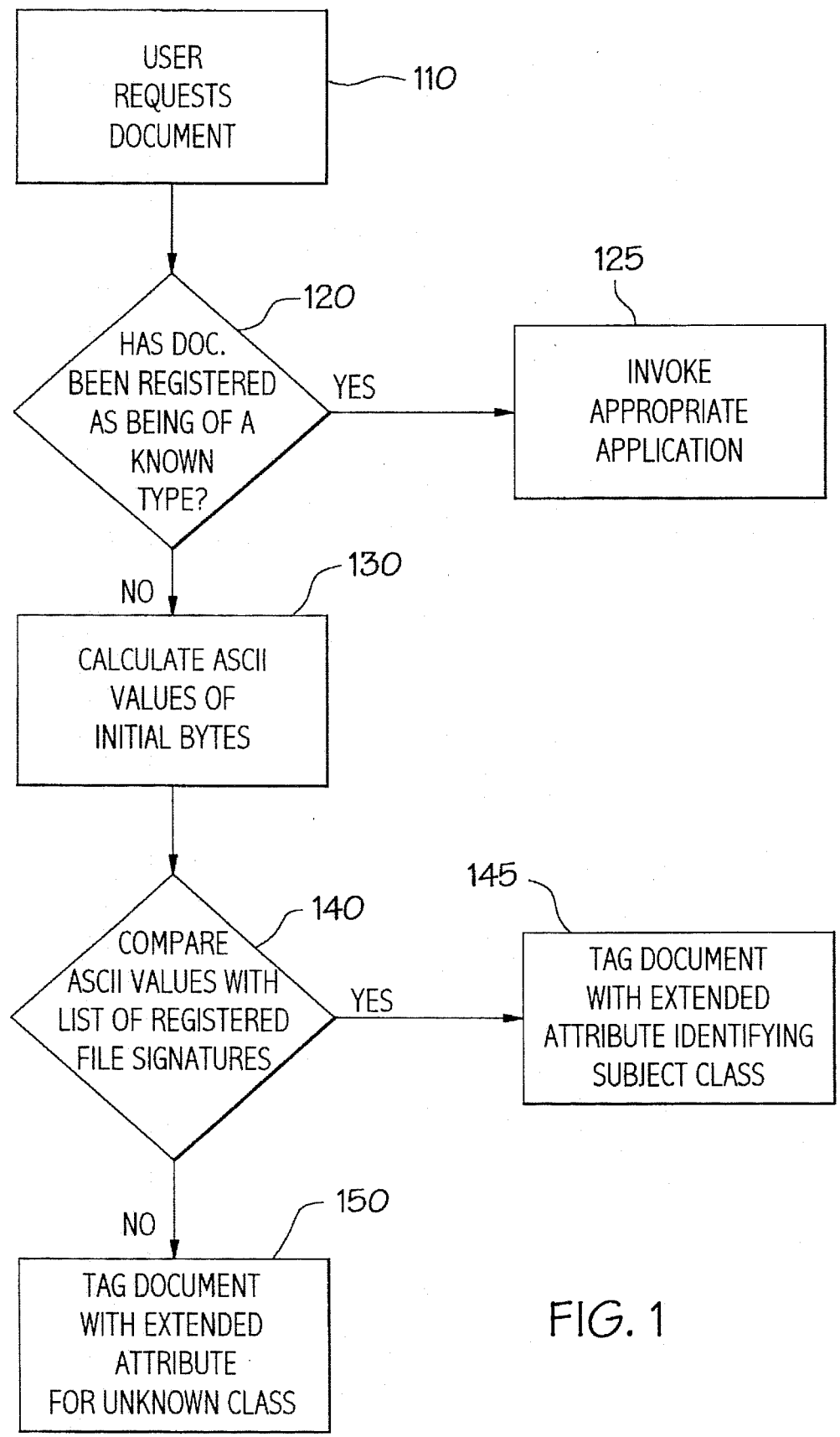
FIG. 1 is a flowchart of a software routine for accomplishing the file type recognition and association of an imported document according to the present invention.

The first aspect of the invention is the recognition of document types by analysis of the file signatures. This means that an association can be made between an application—such as WordPerfect—and a document object that it has created by analyzing the binary data format of the first few bytes of such an object.

The file signature can be described as an ASCII string, using what are known as wildcard characters to denote bytes that can have any value in the signature and another character to represent "NUL" characters. As an example, the signature of a WordPerfect version 5.0 or 5.1 document object is as follows: "\377WPC????\1\12~???~~". In this signature, the following relationship exists between certain characters and the byte values they represent.

| Character | Byte Value Represented |
|---|---|
| ? | any value (i.e., a "wildcard") |
| ~ | a NUL |
| \nnn | the byte value in octal (base 8) |

According to the present invention, to recognize a document object when the user requests that object, the operating system determines the first several bytes of the file content of the document—not by opening an application program but simply by reading the ASCII value of those bytes—and compares those bytes against a pre-stored or "registered" list of file signatures, testing for a match (in WordPerfect, the shell object classes themselves perform this step). If a match is found, the document is tagged with the .TYPE extended attribute that will allow it to be immediately recognized thereafter by the operating system as a member of its object class, i.e., the object is transformed into its proper object class. If no registered signature matches the binary data within the file, the document is marked in such a way that this signature checking will not be performed again until a new document object class is registered onto the system, and thus a new possible match is created.

Since many computers are connected to networks, modems and other communication devices, it is preferred that the recognition of document objects by their file signatures be performed on a regular basis, not just when an application is to be invoked. If the identification process was only performed when a particular document file was selected by the user, it would be necessary to provide some type of document migration application to be invoked at that point, and this would reveal to the end user the fact that even though he/she knows that a particular document was created using a particular application program, for example, WordPerfect, it may not behave in that manner in the system currently in use.

For example, if the user double clicks on the icon of a document just received from a mainframe or Apple Macintosh computer where it was created or last edited using the appropriate version of the WordPerfect application program, the operating system will not yet have recognized the document as a "WordPerfect document," and it will not start the WordPerfect application. However, if the user double clicks on a document created ten minutes, or ten weeks, earlier on a computer using the OS/2 version of WordPerfect, the operating system will recognize the type of the document and, consequently, will open WordPerfect. To the user, both documents are WordPerfect documents; however, to the operating system the new document that was downloaded from the mainframe system is of an unknown document class. This effect would cause user confusion and is undesirable.

To deal with this problem, the operating system preferably is programmed to continuously scan and analyze the file signatures of document objects in the system. Since signature recognition is only performed once per file, this "thread" will only have work to perform when a new directory of documents is opened from the Workplace Shell—or the user retrieves new documents from another operating system platform onto his/her computer. For a discussion on "threads" in the OS/2 environment, see, e.g., *Maximizing OS/2*, pp. 57–62, 79–80, Little, Pennycuff, Semple & Gutknecht, New Riders Publishing, 1992, incorporated herein by reference.

The "file checker thread" operates as an idle activity thread, and thus does not prevent the user from continuing to use the system. New "unrecognized" document objects are analyzed to see if they have any of the pre-registered file signatures during the time slices when the computer is not otherwise needed.

Workplace shell objects exist in two forms. The first form is the dormant form that exists across Internal Program Loads ("IPLs") of the machine (i.e., one can power down and the objects will still be there when the computer is powered up), where the state of the object is represented in data contained within the extended attributes of a file or directory or within a centralized repository file. The second form is called the awakened form, which is the actual in-memory object representation that is displayed to the user. The Workplace Shell has many different mechanisms in place that keep the dormant and awakened forms of the object in synchronization as the user manipulates the awakened form from the user interface.

A straightforward conversion, or "morphing," of a document from one object class to another could be accomplished by the operating system itself. In the case of OS/2, the operation of morphing an active document object could have been accomplished by changing the awakened form of the object back to its dormant form, adding a .TYPE extended attribute to indicate the desired new object class of that document and then re-awakening the document object.

OS/2, however, does not provide this capability, and the implementation necessary to perform morphing is therefore substantially more complicated. Indeed, the Workplace Shell does not allow an object class change of an awakened object, even if the dormant form has its .TYPE extended attribute changed. However, there is an interface between the OS/2 file system and the Workplace Shell that allows the shell to monitor all changes that occur on the hard disk irrespective of what application modified the hard disk storage. This interface exposes one opportunity that allows the morphing process disclosed herein to work: when a file or directory object is deleted from the hard disk, its corresponding awakened form is destroyed—and when a file or directory object is added to the hard disk, a Workplace Shell object will be awakened to represent it, provided that it is within an opened folder. The present invention takes advantage of this facet of the Workplace Shell to morph documents into the proper object class.

Referring to FIG. 1, a user requests a particular document object by double-clicking on the object 110. The system of the present invention responds to that request 120 by comparing that object against a table to determine whether its TYPE has previously been determined by the operating system. If a TYPE has already been determined, the system invokes the appropriate application program 125 and then causes the document to be retrieved by that program. If, on the other hand, the document object has not been TYPED, the system reads the ASCII value of the first several bytes of the document object file 130. Next, the system compares that ASCII value with a stored list of signatures for application programs available on the system to determine whether a match is found 140. If the signature of the document object is matched, the document object is then tagged in its extended attribute with the TYPE of the identified object class 145. If no match is found, the object is tagged with an extended attribute entry indicating that the class for that object is currently unknown 150.

Figure 2:
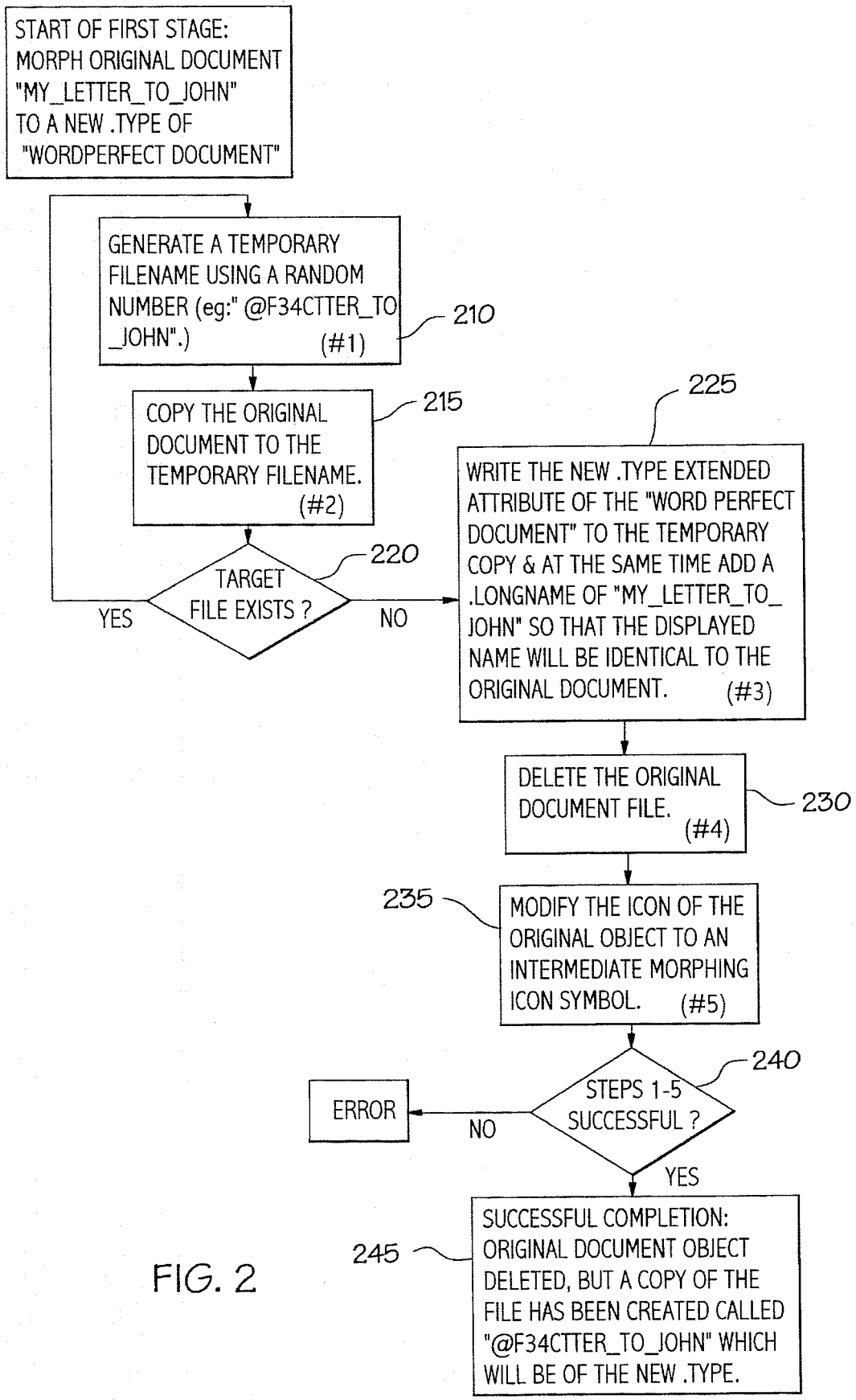
FIGS. 2 and 2a comprise a flowchart of a software routine for "morphing" an imported document according to the present invention.

Referring to FIG. 2, after an object document's file signature has been matched to a registered file type and it has been determined that "morphing" is necessary, the morphing process is initiated as follows.

First, the original document file is copied to a temporary file in its current directory 210, 215. The name of the temporary file is constructed in such a way as to be very unlikely to conflict with any other file in the directory, e.g., the temporary filename is identical to the original document filename but with the first five characters replaced with an '@' character followed by a four digit random hexadecimal number. For example, the file "My_Letter_To_John" might be copied to "@F34Ctter_To_John." If a name conflict is detected, another random hexadecimal is chosen until there is no name conflict 220.

The temporary file then has a new .TYPE extended attribute written to it so that the operating system will recognize it as being a member of the desired object class 225. At the same time, the original document object title is written as a .LONGNAME extended attribute to the file so that when the Workplace Shell awakens the temporary file it will appear to have the same name as the original object—even though it has a different filename 225. In addition, it is necessary to save the original object's icon position and other attributes so that they can be restored properly when morphing is complete. The original document file is deleted 230.

Next, an intermediate "morphing" icon (for example, a half-toned file icon) is created when the Workplace Shell awakens the temporary file 235. The "morphing" icon is given to the original document object to indicate to the user that it is undergoing metamorphosis, at the same time preventing the user from deleting or moving the original document icon from the user interface.

Finally, if the preceding steps were successful 240, the original document object is deleted 245.

Figure 2A:
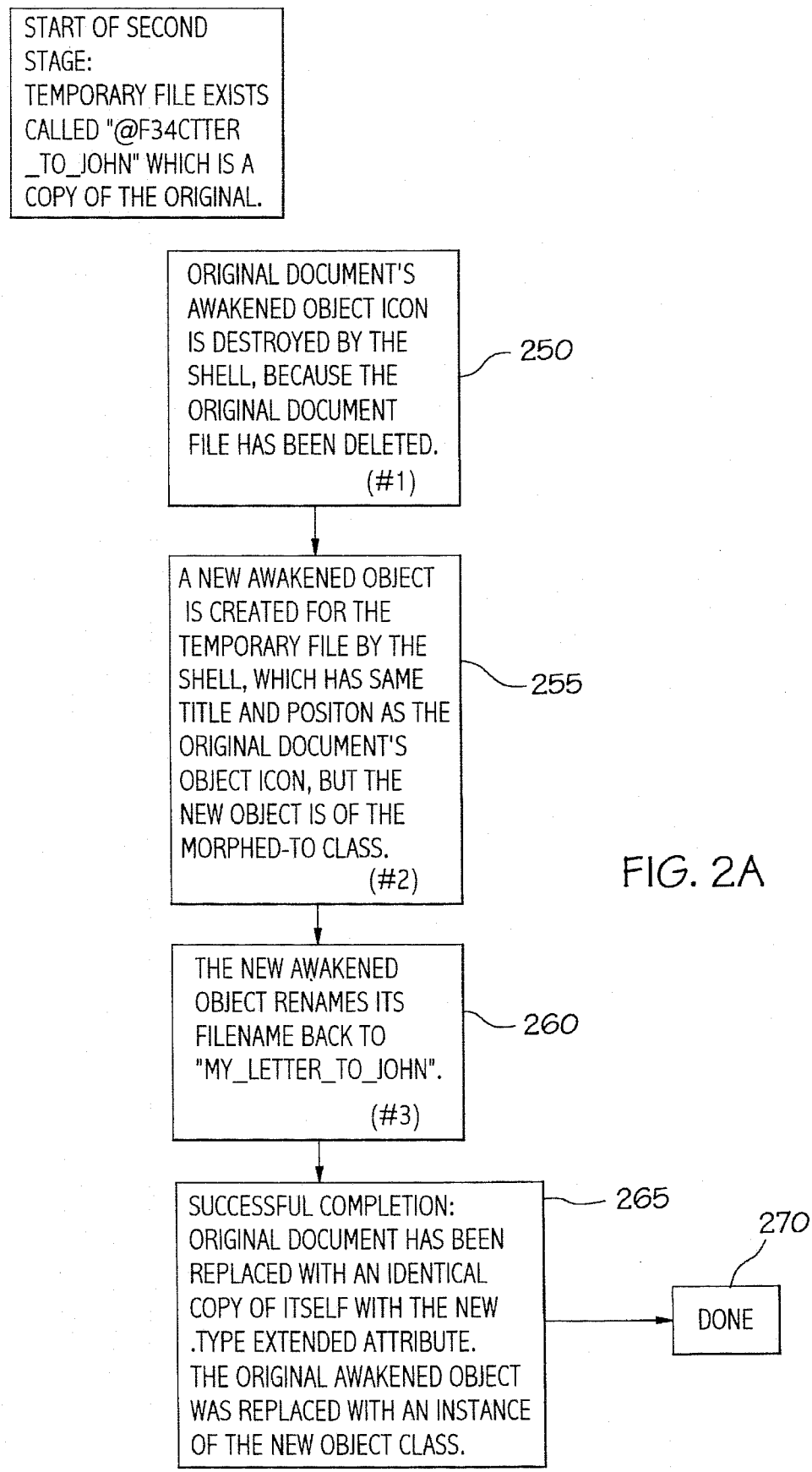

Next, referring to FIG. 2a, the Workplace Shell's file system notification mechanism comes into play. It recognizes that files have been changed on the hard disk and after several seconds causes an automatic refresh of the folder that contained the original document object to occur.

The original document object's awakened form will automatically be destroyed by the OS/2 shell, which causes the temporary "morphing" icon to be removed from the folder content 250.

The temporary file object (called "@F34Ctter_to_John" in the example) is then awakened, and appears in the user's folder as the "morphed-to" object class, having the default icon for that object and the same title and icon position as the original object 255.

Next, as the temporary file is awakened, it automatically changes its real filename back to the original document filename 260.

Finally, since the newly added object appeared at exactly the same screen location and with the same name as the original document, it appears to the user as though the object has merely morphed into another class 265. In actual fact, the original document has been copied, deleted and then the copy has been renamed back to be the same filename as the original document 265. At that point, morphing is complete 270.

Although the present invention is described in the context of the OS/2 operating system platform with an implementation using WordPerfect 5.2 for OS/2 as the example application program, it will be appreciated that the disclosed invention is also applicable to any object-oriented platform with a graphical user interface in which an object of one class is changed to an object of a second object class. In particular, the invention is applicable to other object-oriented platforms with graphical user interfaces, including, without limitation, Taligent's object based operating system and Microsoft's Cairo shell environment.

We claim:

1. A method, in an object-oriented operating system, of classifying object classes to file objects from different computer systems at the level of the operating system, the method comprising the steps of:

a. providing stored file signatures corresponding to each of a plurality of object classes;

b. examining a signature part of the body of a file object;

c. comparing the signature part of the file object with the stored file signatures to determine if a match exists;

d. if a match exists, classifying and displaying an object class corresponding to the matched stored file signature to the file object in the operating system; and, e. if no match exists, classifying and displaying the file object as a file not associated with any known object class in the operating system.

2. A method as recited in claim 1, whereby the object-oriented operating system is a graphical user interface.

3. The method of claim 1 wherein the step of classifying and displaying an object class corresponding to the matched stored file signature to the file object is accomplished by:

a. copying the file object to a temporary file;

b. creating an intermediate icon representing the temporary file, which appears to be an icon representing the file object;

c. writing an extended attribute, which is recognizable by the object-oriented operating system, to the temporary file that classifies it in the object class corresponding to the matched stored file signature;

d. deleting the file object; and e. replacing the intermediate icon with a default icon representing the object class corresponding to the matching stored file signature.

4. A method as recited in claim 2, whereby the extended attribute is a .TYPE extended attribute.

5. A method as recited in claim 3, whereby the intermediate icon is a morphing icon.

6. A method, in an object-oriented operating system, of classifying and displaying an object of a first object class to an object of a second object class, the method comprising the steps of:

a. copying the object of the first object class to a temporary file;

b. creating an intermediate icon representing the temporary file, which appears to be an icon representing tile first object class;

writing an extended attribute, which is recognizable by the operating system, to the temporary file that classifies it with the second object class;

d. deleting the object of the first object class; and e. replacing the intermediate icon with a default icon representing the second object class.

7. A method as recited in claim 6, whereby the extended attribute is a .TYPE extended attribute.

8. A method as recited in claim 6, whereby the object-oriented operating system is a graphical user interface.

9. A method as recited in claim 6, whereby the object of the first object class is from a different operating system.

10. A method as recited in claim 6, whereby the intermediate icon is a morphing icon.

\* \* \* \* \*

UNITED STATES PATENT AND TRADEMARK OFFICE
CERTIFICATE OF CORRECTION

PATENT NO. : 5,542,086
DATED : July 30, 1996
INVENTOR(S) : Andrew et al.

It is certified that error appears in the above-indentified patent and that said Letters Patent is hereby corrected as shown below:

Claim 6, column 8, line 2, delete "tile".

Claim 6, column 8, line 2, after "representing", insert --the--.

Signed and Sealed this

Twenty-eighth Day of October, 1997

Attest:

BRUCE LEHMAN

Attesting Officer　　　　Commissioner of Patents and Trademarks